United States Patent
Grantham

[15] 3,667,574
[45] June 6, 1972

[54] CHASSIS LUBRICATION SYSTEMS

[72] Inventor: Max Edward Grantham, Plympton, Plymouth, England

[73] Assignee: Tecalemit (Engineering) Limited, Plymouth, Devon, England

[22] Filed: Dec. 2, 1969

[21] Appl. No.: 881,423

[30] Foreign Application Priority Data

Dec. 3, 1968   Great Britain.....................57,369/68

[52] U.S. Cl. .................................................184/7 R, 74/89
[51] Int. Cl. ..........................................F16n 7/14, F16n 13/22
[58] Field of Search ....................184/7; 74/89, 89 I, 126, 88

[56] References Cited

UNITED STATES PATENTS

| | | | |
|---|---|---|---|
| 2,978,915 | 4/1961 | Metcalf | 74/89 |
| 2,942,580 | 6/1960 | Siravo | 74/89 I |
| 3,075,395 | 1/1963 | Leland | 74/89 |
| 3,308,410 | 3/1967 | Biser | 74/88 X |
| 3,456,761 | 7/1969 | Woor et al. | 184/7 |

*Primary Examiner*—Manuel A. Antonakas
*Attorney*—Mason, Kolehmainen, Rathburn & Wyss

[57] ABSTRACT

Figure 1:
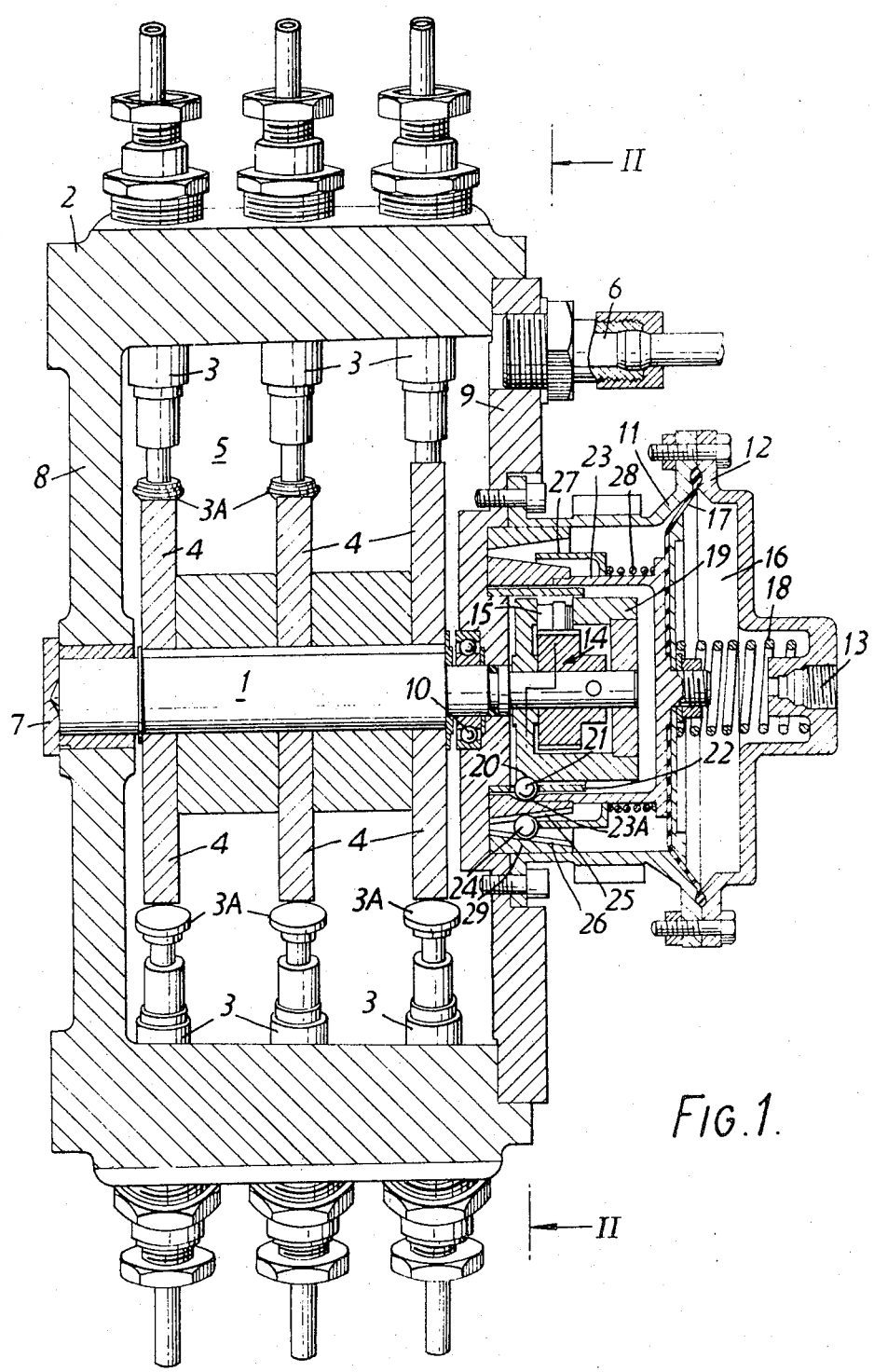

A motion transfer device is provided for use in lubricating apparatus and systems. This device is for axial mounting on a pump having a rotating shaft. A diaphragm 17 is moved by reduced air pressure in space 16 and moves an inner housing 23 axially. Housing 23 cooperates with member 19 via balls 21 running in helical grooves in the housing and member. This member causes shaft 1 to rotate by use of a pawl and ratchet (14,15). Housing 23 is constrained to move axially by balls 24 rolling in axial grooves in the housing 23 and on part 29 (FIG. 1).

3 Claims, 2 Drawing Figures

PATENTED JUN 6 1972

3,667,574

SHEET 1 OF 2

CHASSIS LUBRICATION SYSTEMS

This invention provides a modification to the lubricating apparatus described and claimed in U.S. Pat. No. 3,456,761.

The lubricating apparatus is operated by air under reduced or increased pressure and for use under reduced pressure a large diameter/stroke ratio is required. In order to obtain a compact arrangement, the device operated by the reduced pressure should be mounted axially on the pump. The present invention provides a motion transfer device, operable under reduced or increased air pressure, which is axially mounted on the lubricant pump.

The motion transfer device of the invention provides a generally cylindrical first housing, which is axially reciprocable by pressure below or above atmospheric pressure, and reciprocably rotates another housing (which is preferably within the first housing) through at least two balls between and contacting the housing and cooperating with a helical trough in one of them.

A low torque action can be achieved by positioning parallel and corresponding helical troughs on opposed surfaces of the first housing and the other housing. The balls are restrained to transfer motion between the housings by being positioned in a slot in a member between the housings. Preferably this slot is helically positioned on the member and is also normal to the troughs on the housings.

The first housing may be restrained to move axially, by having balls moving in cooperating axial troughs on opposed faces of the first housing and a fixed housing, which will preferably be external to the first housing.

Figure 2:
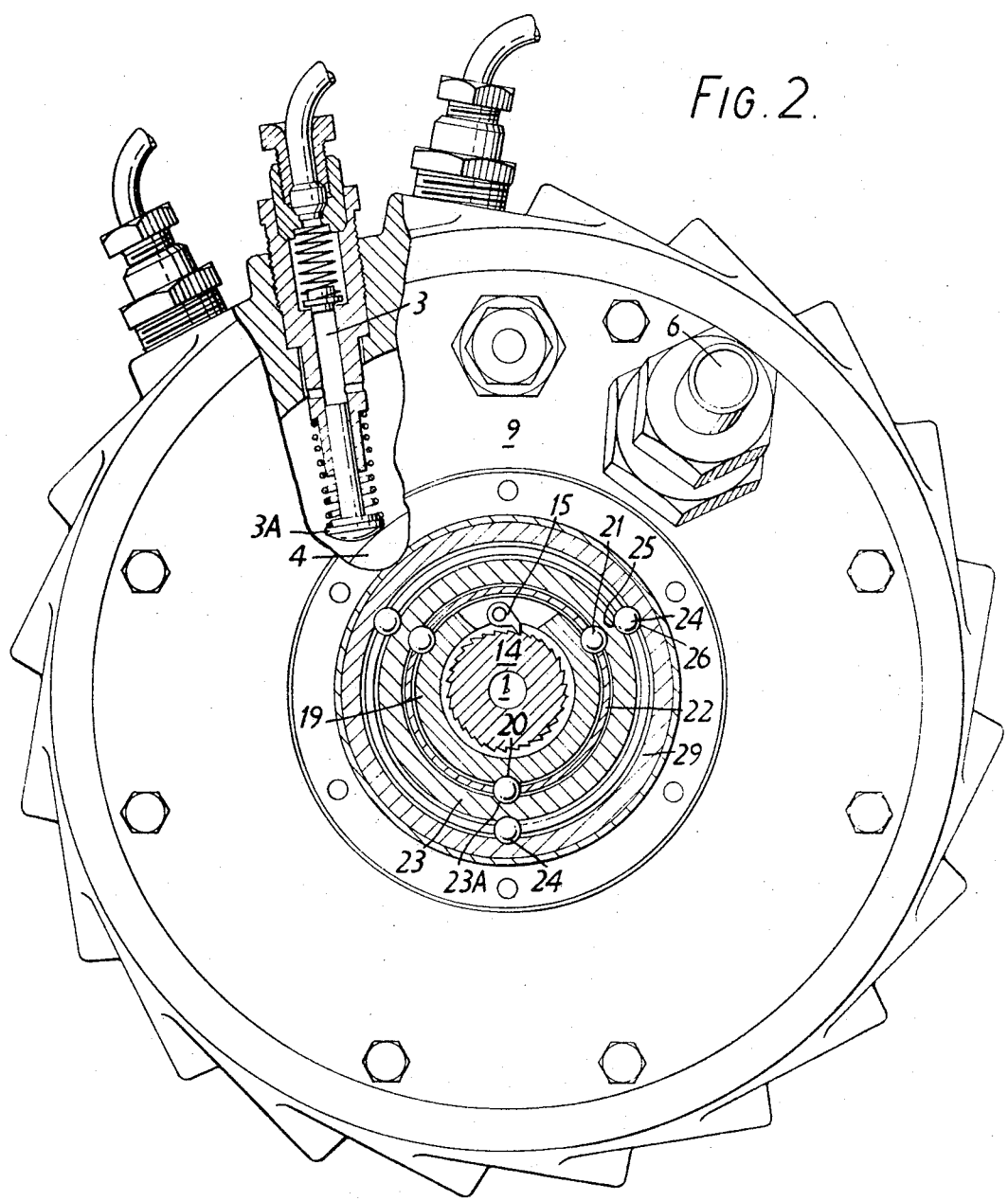

An embodiment of the motion transfer device according to the invention will now be described by way of example with reference to the accompanying diagrammatic drawings in which:

FIG. 1 shows a longitudinal section through the device and the associated pump mechanism; and FIG. 2 shows a radial section through the device along the cranked line II—II of FIG. 1.

A shaft 1 extends along the cylindrical axis of a pump housing 2. The shaft is carried in a bush 7 in an end wall 8 of the housing and in an annular bearing 10 in an opposed end wall 9. Pumps 3 extend through the housing 2 and open into a pump space 5 within the housing, the pumps have piston ends 3A which are movable radially by cams 4. These cams are keyed to the shaft 1 so that rotation of the shaft causes the piston ends 3A to reciprocate thus operating the pumps 3 and moving lubricant from the pump space 5, through the pumps, to a lubricant supply system. Lubricant enters into the space 5 through inlet 6.

It will be noted that the movement necessary to work the pumps is provided by rotation of shaft 1 and on the right handside of FIG. 1 is seen the device which provides a transfer of motion from a reciprocating linear type to a stepwise angular type. It is to this device that this invention is particularly directed as a modification of the apparatus described and claimed in U.S. Pat. No. 3,456,761.

A cylindrical housing part 11 and an end housing part 12 are attached to the outer face of end wall 9 by means of peripheral bolts. A fluid inlet 13 is in the housing part 12 and through this inlet 13 can be supplied operating fluid at a pressure above or below atmospheric pressure. The embodiment to be described is operated by pulses of reduced pressure but the invention contemplates a device operated by increased pressure. The operating fluid is obtained as proposed in U.S. Pat. No. 3,456,761. The inlet 13 communicates with a pressure space 16 existing between the end housing part 12 and a flexible diaphragm 17 peripherally clamped between the housing parts 11, 12. The diaphragm 17 is biassed from the part 12 by a helical spring 18 within the space 16. This diaphragm is shown in its rest position so that reduction of pressure in space 16 moves the diaphragm outwardly towards the housing part 12 compressing the spring 18.

It is convenient to consider now the components of the device adjacent the shaft 1, which are moved by the diaphragm under operating conditions. A ratchet wheel 14 having peripheral ratchet teeth is attached to the shaft 1. The teeth cooperate with a pawl 15 carried on an inner member 19 which embraces the wheel 14 and is journalled on shaft 1. Thus angular reciprocation of member 19 causes stepwise rotation, in one direction, of the wheel 14 and hence the shaft 1, i.e. unidirectional clutch means are provided between the other housing and the shaft.

The pawl and ratchet cooperation can be clearly seen in FIG. 2. The pawl is biased against the teeth so that it rides over the wheel when the member 19 rotates in one direction (anticlockwise in FIG. 2). On the external cylindrical surface of the member 19 there are three trough like ball tracks 20. These tracks are at an angle of approximately 45° to the cylindrical longitudinal axis of the member 19. The tracks 20 are angularly spaced around member 19 (see FIG. 2) and it is possible to utilize more tracks although a pair of tracks is considered the minimum. Balls 21 are positioned in the tracks 20 being movable along these tracks and corresponding tracks 23A, parallel to tracks 20, on the inner surface of the cylindrical part of a cup-shaped inner housing 23. The balls also lie in slots in a cylindrical keeper ring 22 attached to the end wall 9. These slots are helically positioned in the ring 22 and are each normal to the pairs of tracks 20 and 23A. If the inner housing 23 is reciprocated thus axially (i.e. towards and away from the shaft 1) the balls 21 roll in their tracks 20, 23A and a rotational force is transmitted to the member 19 through the track 20 also, being restrained by the ring 22 the balls 21 are held in position during the period in which reversal of direction of motion takes place.

An axial movement is given to the housing 23 because it is attached to the diaphragm 17 with the aid of a bolt extending through the diaphragm and a diaphragm plate on the outer surface of the diaphragm. However it is necessary to constrain the housing 23 to move in an axial path because if this was not ensured, the housing would rotate as the balls moved along tracks 23A in a sliding manner.

The rotational force may also be transferred to the member 19 by a ball movable in an axial trough in housing 23 and in a helical trough in member 19. Alternatively the member 19 may carry the axial trough and the housing 23 the helical trough. However, the embodiment specifically described in which a ball rolls in parallel corresponding helical troughs, allows a pure rolling action of the ball to be obtained because the path lengths in the troughs are the same. The alternatives proposed use paths of unequal length so that some sliding of the ball will occur. The pure rolling action gives a lower torque to the system.

The housing 23 is constrained to move in an axial reciprocating path by balls 24 which roll in axial troughs 25, 26. Troughs 25 are on the external surface of housing 23 and troughs 26 on the internal surface of a fixed housing 29 attached to end wall 9. The system of axial troughs and balls (of which there are three) causes the housing to follow an axial reciprocating path although it is subjected to a reaction rotation force from the helical trough system.

Other means may be used to constrain the housing 23, for example an extension from housing 23 or housing 29 moving in an axial trough in the other housing. However, the use of rolling balls reduces the frictional loss.

The balls 24 are retained in their pairs of troughs by a ball retaining ring 27 biased from a radially outwardly directed flange on the housing 23 by a helical return spring 28.

When air below atmospheric pressure is introduced into the pressure space 16 the diaphragm 17 moves outwardly and thus moves housing 23 from end wall 9. This housing 23 moves clockwise (seen as in FIG. 2) and the wheel 14 follows this rotation due to cooperation with pawl 15. Release of pressure allows the housing to move anticlockwise due to the return force of spring 18. The pawl rides over the ratchet teeth with the wheel 14 not rotating.

It will be appreciated that the motion transfer device can be used in combination with a lubricant pump to perform the invention as claimed in the main patent without necessarily rotating a shaft actuating separate pumps. Thus the pump may have other forms in which a rotary motion causes movement of a pump operating member, for example a piston. Thus the present invention provides a motion transfer device which allows a lubricant pump to be operated by pulses of air of increased or reduced pressure. The device of the invention can be made in a compact form.

I claim:

1. In a lubricating apparatus for a vehicle comprising a pump operated by a shaft rotated by air pressure acting on a member, the improvement including a motion transfer device comprising a member movable axially relative to a shaft by air pressure and fixed to a first housing, a second housing coaxial with the first and reciprocably rotatable about the shaft axis by axial movement of said first housing, said two housings being arranged one with the other so that a cylindrical inside surface of one housing surrounds a cylindrical outer surface of the other housing, a fixed keeper mounted between said two adjacent cylindrical surfaces and including a pair of helical slots defined therein, at least two balls disposed between said adjacent cylindrical surfaces of said two housings, each ball mounted within a helical slot in said fixed keeper and movable in a helical trough defined in said cylindrical surface of said first housing and a cooperating parallel trough in said cylindrical surface of the second housing, each slot being arranged at an angle to said troughs and unidirectional clutch means between said housings.

2. A device as claimed in claim 1, in which said troughs are aligned on an angle of approximately 45° relative to the longitudinal axis of said shaft.

3. A device as claimed in claim 2, in which said helical slots in said keeper are normal to the troughs formed in said housings.

* * * * *